United States Patent
Verchere

(10) Patent No.: US 7,127,415 B1
(45) Date of Patent: Oct. 24, 2006

(54) METHOD AND SYSTEM FOR ACQUIRING BRANDED PROMOTIONAL PRODUCTS

(75) Inventor: David Verchere, New York, NY (US)

(73) Assignee: Regency Ventures Ltd., Hamilton Bermuda (GB)

( * ) Notice: Subject to any disclaimer, the term of this patent is extended or adjusted under 35 U.S.C. 154(b) by 505 days.

(21) Appl. No.: 09/441,204

(22) Filed: Nov. 16, 1999

(51) Int. Cl.
*G06Q 30/00* (2006.01)

(52) U.S. Cl. ............... 705/26; 705/27; 705/37

(58) Field of Classification Search ............ 705/26–27, 705/37
See application file for complete search history.

(56) References Cited

U.S. PATENT DOCUMENTS

| | | | |
|---|---|---|---|
| 3,757,037 A | 9/1973 | Bialek | |
| 4,972,318 A | 11/1990 | Brown et al. | |
| 4,992,940 A | 2/1991 | Dworkin | |
| 5,099,422 A | 3/1992 | Foresman et al. | |
| 5,550,735 A | 8/1996 | Slade et al. | |
| 5,666,493 A | 9/1997 | Wojcik et al. | |
| 5,694,551 A | 12/1997 | Doyle et al. | |
| 5,710,887 A * | 1/1998 | Chelliah et al. | 705/26 |
| 5,712,989 A | 1/1998 | Johnson et al. | |
| 5,715,399 A | 2/1998 | Bezos | |
| 5,721,832 A | 2/1998 | Westrope et al. | |
| 5,729,594 A | 3/1998 | Klingman | |
| 5,740,425 A | 4/1998 | Povilus | |
| 5,742,931 A | 4/1998 | Spiegelhoff et al. | |
| 5,758,328 A * | 5/1998 | Giovannoli | 705/26 |
| 5,790,426 A | 8/1998 | Robinson | |
| 5,794,217 A | 8/1998 | Allen | |
| 5,799,284 A | 8/1998 | Bourquin | |
| 5,825,881 A | 10/1998 | Colvin, Sr. | |
| 5,832,459 A | 11/1998 | Cameron et al. | |
| 5,845,263 A | 12/1998 | Camaisa et al. | |
| 5,860,068 A | 1/1999 | Cook | |
| 5,870,717 A | 2/1999 | Wiecha | |
| 5,884,045 A | 3/1999 | Kurihara | |
| 5,884,309 A | 3/1999 | Vanechanos, Jr. | |
| 5,890,175 A | 3/1999 | Wong et al. | |
| 5,895,454 A | 4/1999 | Harrington | |
| 5,897,622 A | 4/1999 | Blinn et al. | |
| 5,897,639 A | 4/1999 | Greef et al. | |
| 5,903,878 A | 5/1999 | Talati et al. | |
| 5,905,973 A | 5/1999 | Yonezawa et al. | |
| 5,907,617 A | 5/1999 | Ronning | |

(Continued)

FOREIGN PATENT DOCUMENTS

WO  WO 97/24691  * 7/1997

OTHER PUBLICATIONS proquest.uni.com, M2 Presswire, "Bemrose: New Promotional products web site sets industry standard(c) 1994-2000 M2 Communications Ltd", pp. 1-2, Apr. 2000.*

(Continued)

*Primary Examiner*—Robert M. Pond
(74) *Attorney, Agent, or Firm*—Hunton & Williams LLP

(57) ABSTRACT

A method and system allows users to purchase branded promotional products over the Internet through a central, real-time exchange process. Users may include customers, resellers, vendor partners, business service partners and medial partners. This system provides a core foundation of services for use over the Internet that facilitates business transactions thereby providing a single point of contact for all branded promotional industry needs. A comprehensive solution is presented for all members of the promotional products industry where high quality products, current and accurate information, and support services with the result that the end user has a consistent, reliable and productive experience are made available.

18 Claims, 4 Drawing Sheets

U.S. PATENT DOCUMENTS

| | | | | |
|---|---|---|---|---|
| 5,913,210 | A | * | 6/1999 | Call .............................. 707/4 |
| 5,918,213 | A | | 6/1999 | Bernard et al. |
| 5,930,768 | A | | 7/1999 | Hooban |
| 6,141,653 | A | * | 10/2000 | Conklin et al. ............... 705/80 |
| 6,167,383 | A | * | 12/2000 | Henson ....................... 705/26 |
| 6,351,738 | B1 | * | 2/2002 | Clark .......................... 705/37 |
| 6,414,693 | B1 | * | 7/2002 | Berger et al. .............. 345/641 |

OTHER PUBLICATIONS

Proquest.umi.com,, Direct marketing, "Branders.com expedites the purchase of promotional products", Apr. 2000.*

Presswire, Open Market: Open MArket Announces New Modular Packaging to Provide Lower entry-level price, May 25, 1998.*

"PromoMart.com Inventory Doubles in Size," PR Newswire, Jan. 20, 1999, 04073674 Dialog File 20: World Reporter.*

"Calcomp, PictureMall.com Announce Strategic Marketing Partnership; Creation Station Users Can Link Directly to PictureMall.com and Receive Special Pricing on Products," Business Wire, Jun. 16, 1998, 01943255 Dialog File 20: World Reporter.*

"Promotional Marketing Strategies a Click Away With PromoMart's IDEA Store," Business Wire, Sep. 17, 1999; 07278306, Dialog File 20: World Reporter.*

"Golf Products on PromoMart Increase Exposure at Golf Tournaments," PR Newswire, May 26, 1998; 01726244 Dialog File 20: World Reporter.*

PR Newswire, "Fulfilling The Promise Of The Internet At Starbelly.com," Sep. 22, 1999, Dialog file 20 #07365792.*

PR Newswire, "Chase Capital Partners And Flatiron Partners Invest In Internet Company Starbelly.com." Aug. 25, 1999, Dialog file 20 #06890229.*

Business Wire, "Ventures Funds Online Business-to-Business Marketplace, BizBuyer.com; Next-Generation Bidding System Matches Small Business With Qualified Vendors," Jun. 22, 1999, Dialog file 20 #05852020.*

Business Wire, "BizBuyer.com Unviels Distinctive New Brand Identity; Leading Business-to-Business Site Launches New User Interface And Comprehensive Marketing Effort," Sep. 22, 1999, Dialog file 20 #07359348.*

Graham, "The Remaking Of The Distribution Chain," American Salesman, Aug. 1999. v44n8pp. 3-8, Dialog file 15 #01858228.*

Business Wire, "Gifted Solutions Announces Its Gift Services Engine," Oct. 6, 1999, Dialog file 610 #00115430.*

M2 Presswire, "Dell And The Internet Go From Strength To Strength," Jul. 7, 1998, Dialog file 20 #02143258.*

Imprinted Products: Waters, "Gateway Opens Promotional Products Web Site," St. Louis Post-Dispatch, Mar. 24, 1997, Proquest.*

Imprinted Products: Maurer, "Internet Solutions," Folio: The Magazine For Magazine Management, Feb. 1, 1998, v27n2p. 28, ISSN #00464333, Proquest.*

Imprinted Products: PR Newswire, "PromoMart Finds Internet Beats Radio And Television Advertising Second Year Running," Sep. 18, 1998, Proquest.*

Imprinted Products: Gines, "The Guide To Corporate Gift Giving," Incentive, Aug. 1998, ISSN #10425195, Proquest.*

Imprinted Products: PR Newswire, "PictureMall Taps Internet Veteran Sandy Goldman as President & CEO And Changes Name To Pix.com," Jul. 22, 1998, Proquest.*

Imprinted Products: Easton, "Sunday Brunch: The Stuff; The Picture Of Sweetness," The Los Angeles Times, Jun. 7, 1998, ISSN #04583035, Proquest.*

Imprinted Products: Business Wire, "CalComp, PictureMall.com Announce Strategic Marketing Partnership; Creation Station Users Can Link Directly To PictureMall.com And Receive Special Pricing On Products," Jun. 16, 1998, Dialog file 20 #01943255.*

Archive: Promomart.com web pages extracted from www.archive.org Wayback Machine. Jan. 16, 1998, 22 pgs. (all pages).*

Online Auctions: Lorge, "Online Bidding Keeps Suppliers In Line," Sales and Marketing Magazine, Aug. 1998, v150n8p. 16, ISSN #01637517.*

Online Auctions: Henry, "But Can You Get It Wholesale?" Kiplinger's Personal Finance Magazine, Jul. 1998, v52n7pp. 115-117, ISSN #1056697X, Proquest.*

Online Auctions: McAllister, "Got Stuff To Sell? Someone Online Will Buy," Richmond Times Dispatch, Nov. 6, 1998, Proquest.*

Online Auctions: Business Wire, "OpenSite Technologies Introduces Innovative Web Auction Partner Program," Aug. 4, 1998.*

Dell Computer: www.dell.com web pages extracted from www.archive.org Wayback Machine, 30 pgs, Jan. 13, 1998 (pp. 2-23, and 25), Dec. 2, 1998 (pp. 24, 26-28), Feb. 22, 1999 (pp. 29-30).*

Dell Computer: Business Wire, "New Paperless Purchase Order Moves Dell Computer Customer Premier Page Service A Step Closer To Virtual Integration," Jun. 16, 1998, Dialog file 20 #01939695.*

Green et al., "Online Merchants: Cyberspace Winners: How They Did It," Business Week,Jun. 22, 1998, n3583p. 154 ISSN #07398395, Proquest.*

Maloney, "Accrue Software," Fortune, Jul. 7, 1997, v136n1pp. 102-104, ISSN #00158259, Proquest.*

Promomart: Internet Archive Wayback Machine, www.archive.org; http://web.archive.org/web/.../http://www.promomart.com; Jan. 16, 1998, 23 pages.*

Lorge, Sarah; "Online Bidding Keeps Suppliers in Line," Sales and Marketing Management, Aug. 1998, v150n8p. 16, 3pgs, Proquest #32425047.*

Bunn, Dina; "Web Site Offers Opportunity for a Do-it-yourself Print Ad," Rocky Mountain News, Aug. 9, 1998, Proquest #32780962.*

Busch, Melanie; "Companies Spin Own Webs With Intranets," Tulsa World, Aug. 25, 1996, Proquest #17333510.*

UU: Business Wire; "911gifts.com Expands Features, Service and Merchandise to Rescue Holiday Shoppers," Nov. 16, 1998, Proquest #36002299.*

911gifts.com: Internet Archive Wayback Machine, www.archive.org; http://web.archive.org/web/....../http://www.911gifts.com; Jul. 12, 1998, 4 pgs.*

Gonzalez, Jennifer Stone; The 21st-Century Intranet, Prentice Hall, 1997, 1998, pp. 48-50, 5 total pgs.*

Moran, Nula; "Business-to-Business Links Now- The Attention Turns to Extranets," Financial Times, Jun. 4, 1997, 3pgs, Proquest #12217826.*

Business Wire; "Hyundai Selects Click Interactive to Provide Industry's First On-Line Parts-Ordering Extranet for Consumers and Repair Professional," Aug. 13, 1998, 2pgs, Proquest #32825067.*

PR Newswire; "SpaceWorks OrderManager 4.0 Release Strengthens Order Management Automation Up and Down Supply Chains," Sep. 23, 1998, 3pgs, Proquest #34498373.*

UU: Bort, Julie; "Extranets Come in Different Styles. Do You Know Which is Best for Serving Your Business Partners? The Model Extranet," Network World, Mar. 30, 1998, v15n13p. M19, 6pgs, Proquest #28244454.*

VV: Siegel et al.; "The Intranet and Extranet," The CPA Journal, Feb. 1998, v68n2p. 71, 4pgs, Proquest #26176218.*

Knowledge Representation Model For Engineering Information Circulation of Standard Parts, Umeda et al., Journal: Transactions of the Information Processing Society of Japan, vol. 38, No. 10, p. 1905-18, Oct. 1997.

International Search Report, International Application No. PCT/US00/30433.

* cited by examiner

METHOD AND SYSTEM FOR ACQUIRING BRANDED PROMOTIONAL PRODUCTS

FIELD OF INVENTION

The present invention relates to the field of methods and systems of purchase within the branded promotional products industry.

BACKGROUND OF THE INVENTION

Branded promotional products include advertising, sales promotion and marketing communications media that use merchandise imprinted with an advertiser's identification, message or logo. These items effectively communicate a brand identity or a message and are used to create brand awareness, solidify customer relations and increase sales. The branded promotional products sector of the advertising industry provides unique marketing opportunities. Branded products are easy to understand and are useful in meeting many marketing objectives such as announcing a name change or building a company image.

The personal touch inherent in gift giving makes branded product advertising a high-impact tool when used in conjunction with other media. Typical uses include building brands, launching products, introducing reminder advertising, improving customer relations, generating new customers and/or accounts, increasing traffic and awareness at trade shows, safety programs, annual meetings, seasonal events, public relations, employee relations, and other advertising and marketing uses.

Branded promotional products are adopting a more active role in marketing as mass media such as print and television integrate with other promotional efforts. Because branded products provide a personal touch, they are effective and important marketing tools.

Customers increasingly expect more value from their purchasing experience with a high quality product that promotes their brand. They want a useful product obtained through a convenient transaction. Customers are often frustrated because they have to rely on a reseller for purchasing options and the flow of information. Resellers are expected to find customers favorable prices, produce samples and ensure timely delivery.

Currently, vendor partners have little or no contact with customers and rely on resellers to reach customers. Vendor partners spend significant amounts of effort and money providing price quotes and samples to resellers. It is difficult for vendor partners to gather product or customer market research and customer buying pattern information.

Traditionally, the promotional products industry has operated under a linear supply-chain model of distribution. Typically, the customer hires a reseller to assist in selecting a branded product for an event or promotion. The reseller locates the desired merchandise through established vendor partner relationships. The vendor partner manufacturers or imports the items, adds the brand, and ships the product. Business service partners provide services such as shipping, financing, and insurance. Media partners deliver educational and other useful information.

Thus, a comprehensive solution for all members of the promotional products industry that includes high quality products, current and accurate information, and support services with the result that the end user has a consistent, reliable and productive experience is needed.

SUMMARY OF THE INVENTION

An object according to the present invention is to overcome these and other drawbacks with existing systems.

It is an object of the present invention to create a central, real-time exchange serving customers, resellers, vendor partners, business service partners and media partners.

It is another object of the present invention to provide customers with a fast, cost efficient and simplified e-commerce solution to promote a brand.

It is another object of the present invention to provide resellers with the opportunity to leverage their sales efforts by streamlining the process of sourcing and pricing products and automating tedious administrative tasks.

It is another object of the present invention to provide vendor partners with an e-commerce end-to-end business solution to manage the cataloguing, production and distribution process.

It is another object of the present invention to provide business service partners with the opportunity to offer services such as shipping, insurance, and financing.

It is another object of the present invention to provide media partners with the opportunity to provide resources, such as educational materials, literature and conference information to members of the promotional products industry.

The present invention provides an all-encompassing exchange that offers scaling opportunities and economies not available in the traditional business model. An online industry standard pipeline for data and order flow manages the production and distribution process from beginning to end. The present invention offers a selection of high value, high quality promotional products available online. The process of selection, pricing, ordering and branding of merchandise is facilitated through the present invention. In addition, support services including shipping, financing, insurance and other essential business services are provided by the present invention. Market and customer research information is also available.

Other objects and advantages of the present invention will be apparent to one of ordinary skill in the art upon reviewing the specification herein.

DETAILED DESCRIPTION OF THE PREFERRED EMBODIMENTS

Figure 1:
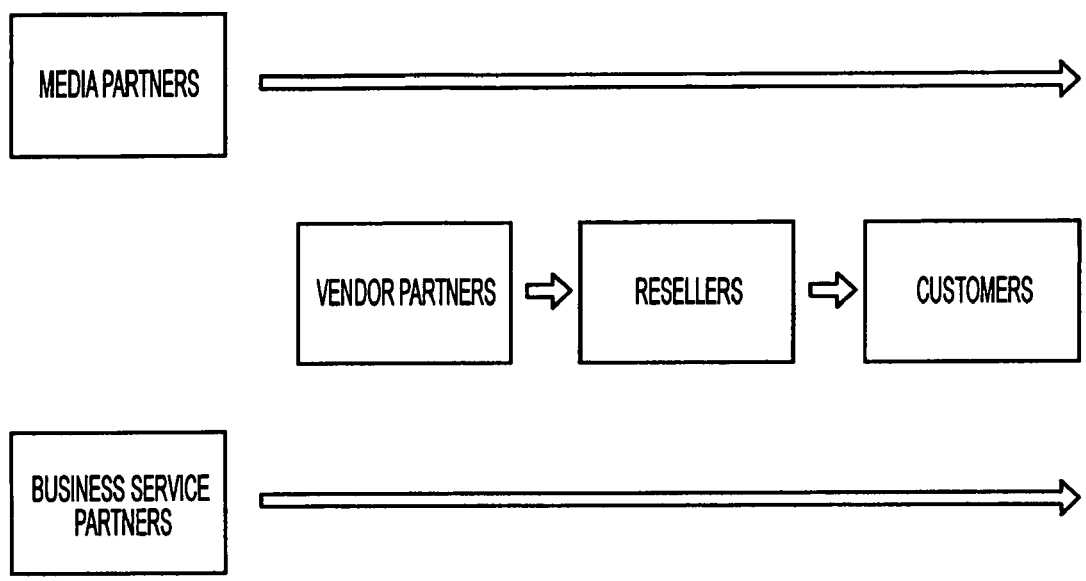
FIG. 1 is a diagram of a traditional promotional products industry under a linear supply chain model of distribution.

The present invention provides a central real-time exchange. This exchange creates a community environment for all participants in the promotional products industry and provides services that establish a web presence for each member. Business-to-business services available to each member through the exchange promotes operational efficiency and cost effectiveness. The goal of the exchange is to build a core foundation of services for use over the Internet that provides an easy and global method of facilitating business transactions amongst its members in a common environment.

Members of the promotional products industry may include customers, resellers, vendor partners, business partners and media partners. Customers may be an end-user of promotional products. Usually, customers include individuals who buy products directly through the present invention. Resellers may be distributors who resell goods and services to the customer. Vendor Partners may include suppliers who offer products and imprinting services. Media Partners may offer content, e.g., industry magazines, industry research organizations, and expert columnists. Business Service Partners may offer services such as fulfillment, shipping, insurance and financing.

The present invention provides customers with an easy, efficient method of purchasing branded promotional products online. The present invention enables customers to browse through a set of products of interest. The customer's logo and artwork may be securely maintained in a readily available personal or corporate online library. Customers are also provided with the ability to view their firms' logo applied directly to the products selected. The production and delivery of orders online may be tracked by the present invention where the customer is given access to the order status on demand. In addition, reminders for recurring events may be sent to the customer. The present invention may also create custom web pages for corporate clients to manage their branding program and products.

The present invention provides resellers the opportunity to leverage their sales efforts by streamlining the process of sourcing and pricing products and automating tedious administrative tasks. Other services may include a selection of high quality products from vendor partners; timely information on new products; seasonal and special offers; online order tracking; shipping, insurance and financing options; customer ordering; demographic and usage data and market research information.

The present invention provides vendor partners the ability to manage the cataloguing, production and distribution processes. The present invention may collect, house and distribute product images, specifications, and pricing information. Vendor partners may update this information online and on demand. The present invention may track order, production and billing information flow and make this information available online; arrange financing to eliminate accounts receivable and credit risk; and record customer, ordering, demographic and usage information. Also, vendor partners may create and maintain unique web-site and datalinks. Vendors partners may also bid on customer orders through the present invention. Thus, the present invention provides an incentive for vendor partners to continue entering data and maintaining data as accurately as possible by offering the ability to resell the information.

The present invention may leverage web site income by developing additional sources of revenue from business service partners. Services such as fulfillment, shipping, insurance, financing and other sources of revenue may be offered to facilitate the order process and to lower overall costs.

The present invention provides media partners the ability to resell educational materials, literature and conference information and sell space for industry-relevant advertising. The present invention provides a forum where any member of the promotional products industry may find and purchase appropriate resources.

FIG. 1 is a diagram of a traditional promotional products industry under a linear supply-chain model of distribution. In this model, the customer hires a reseller to find a branded product. The reseller locates the product to be branded through a vendor partner. The vendor partner provides the product requested, imprints the logo or brand and ships the product to the reseller who then sells the product to the customer. Business service partners provide various services, such as shipping, financing and insurance. Media partners provide educational materials, literature, conference information and other useful information.

Figure 2:
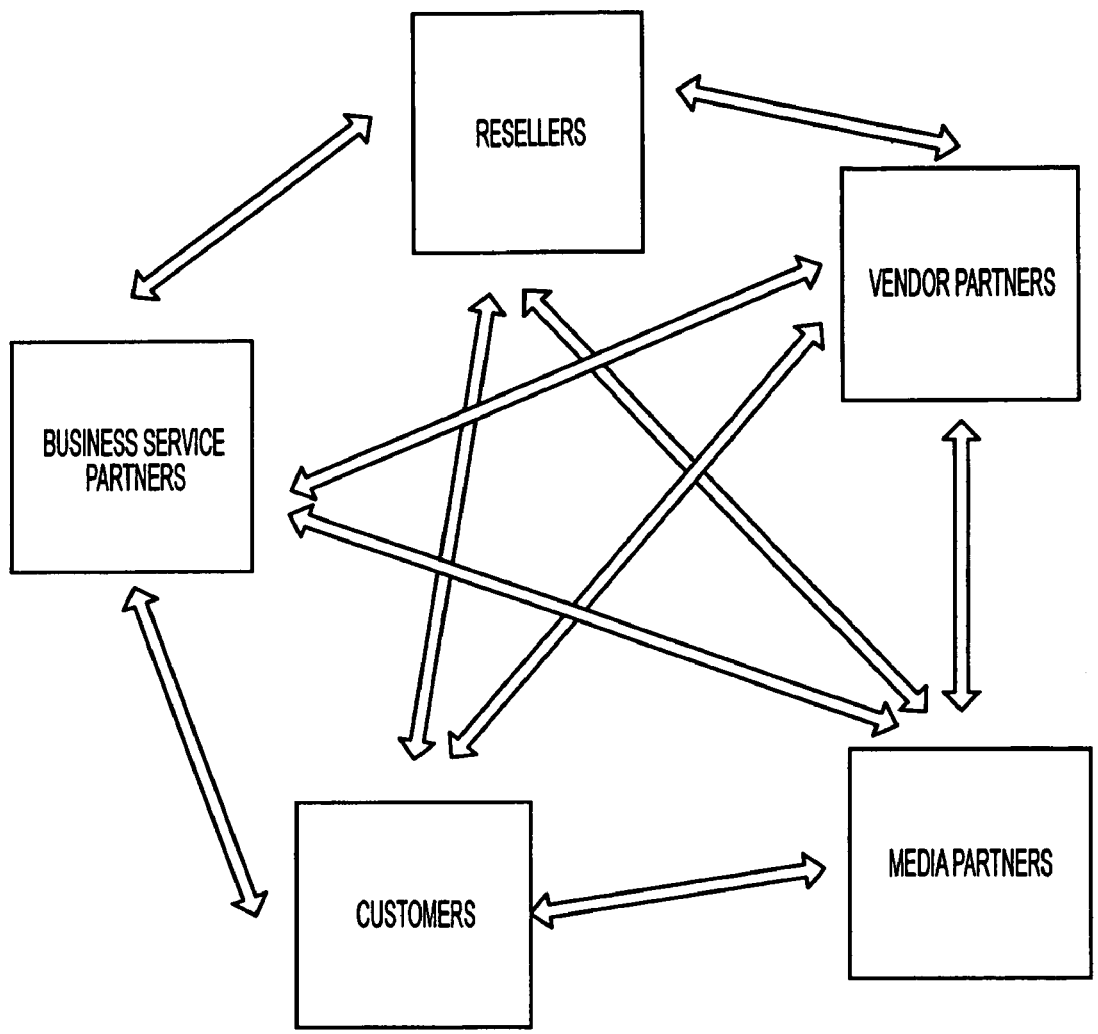
FIG. 2 is a diagram of a central real-time exchange according to the present invention.

FIG. 2 is a diagram of a central real-time exchange model according to the present invention. Each member of the promotional products industry may exchange information and requests over the Internet. This promotes efficiency and facilitates business relationships. One object of the central real-time exchange is to bring the members of the industry together in a business-to-business e-commerce environment over the Internet. Another objective is to standardize the practices in the industry by providing efficient services for each member.

Figure 3:
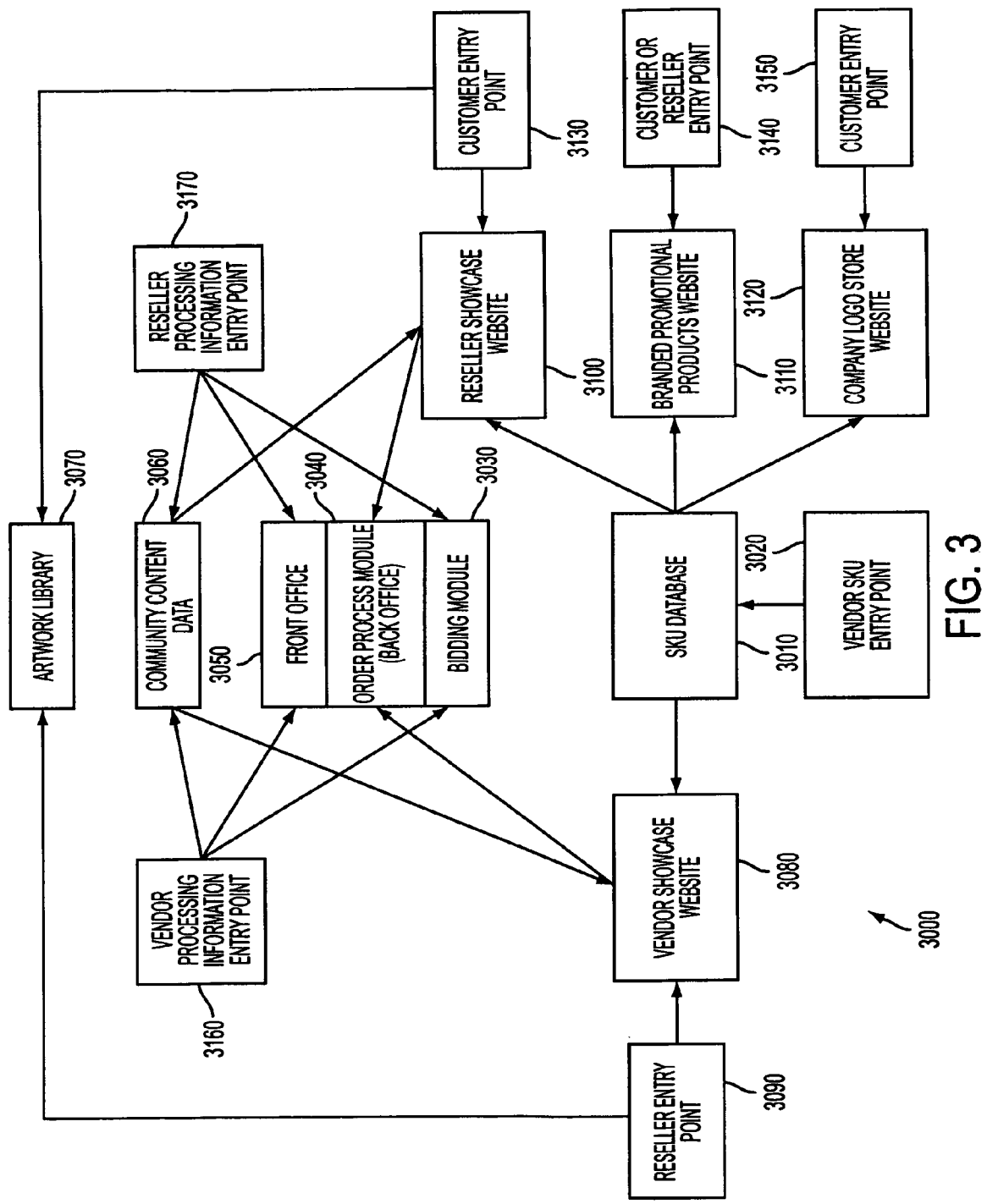
FIG. 3 is a detailed diagram of a central, real-time exchange according to an embodiment of the present invention.

FIG. 3 is a detailed diagram of a central real-time exchange according to an embodiment of the present invention. The overall exchange structure 3000 may be programmed to be stateless in a preferred embodiment. This allows for greater scalability as well as database protection.

The Stock Keeping Unit ("SKU") database 3010 may include vendor product, pricing, service, and imprinting information. A SKU is assigned to every vendor partner product including variations within a product category. For example, a blue pen has a different SKU than a red pen. Vendors may enter product information in the SKU database at vendor entry point 3020. Information entered may include general product information; imprinting information based on dynamic product entry; quantity breaks; net pricing per quantity; net setup costs by imprint method, number of locations, and number of imprint colors; net run charges per quantity based on imprint colors; a markup percentage added for each quantity to create their own retail pricing and other similar product information. Vendors may also enter a flag to delete a product and all associated artwork files. Vendors may upload an original product artwork file at any time for any or all SKUs generated for a product.

The vendor may specify calendar dates to display his or her products on the web-site of the present invention. Vendors may elect product placement at an editorial level, product placement at a homepage level, or search position product placement. The product placement at an editorial level allows vendors to position an SKU in the content area of the web-site of the present invention. The product placement at a homepage level allows vendors to position a SKU on the homepage of the web-site of the present invention. The search position product placement allows vendors to select the position of product display in a search. Also, the search position product placement may be selected based on product list, price point, category, idea or department, text search, and other criteria. This feature allows vendors to select exact placements of products depending on the popularity of the product and marketing strategies.

Vendor Showcase Web-site 3080 may display vendor product information and provide inquiry and ordering access to resellers at the reseller entry point 3090. Vendors may customize their web-site by choosing which SKU images to display on their showcase web-site and other features available. Vendors may offer various services on their web-site to resellers. For example, resellers may order products for their customers from the Vendor Showcase Web-site, receive price information, create purchase quotes for customers, and other related services.

The Branded Promotional Products web-site 3110 provides a variety of promotional products, inquiry and ordering access to customers and resellers at 3140.

Services available may include the ability to view a selection of high quality products and their images; select products based on a variety of criteria; view the product unit price, setup price, and run charges; offer a quote service showing prices at quantity breaks and order products from the web-site where orders may be charged to a credit card or to a credit account opened with the present invention. In addition, customers and resellers may receive acknowledgements for orders placed; attach artwork files; order history listing quotes and acknowledgements; review industry and media content; select services provided by business partnerships; select shipping method; customize a search and receive other similar options available to a customer or reseller.

Reseller Showcase Web-site 3100 may display products selected by the reseller for resale to his or her customer at 3130. Resellers may customize their showcase web-site by choosing which SKU images to be displayed. Resellers may choose to display non-branded SKU images or their own logo on the SKU images.

Resellers may offer various services to their customers through their Showcase Web-site 3100. Such services may include allowing the customer to view the product unit price, setup price and run charges; offering a quote service for customers to generate a quote for themselves showing prices at quantity breaks; ordering products from the web-site; attaching artwork files and other product related services.

Company Logo Store Web-site 3120 may display products selected by a particular reseller or store owner for resale to his or her customers at 3150. Company Logo Stores include a specialized showcase web-site carrying products branded with a particular company's logo. Resellers may offer various services to customers on their Company Logo Site. Such services may include allowing the customer to view the product unit price; offering a quote service for customers to generate a quote for themselves showing prices at quantity breaks; allowing customers to order products from the web-site; selecting services provided by business partnerships and other related services.

Order Process Module or Back Office 3040 may check credit, process orders and generate appropriate payment and accounting entries. Back Office 3040 may process orders which includes receiving orders from credit card processing, checking the credit account, reviewing/editing and releasing the purchase order to the product and/or an imprinting vendor, creating vouchers, calculating financing charges, sending automatic email responses back to customers or resellers when an order is actually shipped and providing other related services.

As to the Vendor Showcase Web-site 3080, Back Office 3040 may review/edit and release purchase orders to the Branded Promotional Products web-site 3110, review/edit and release change order purchase orders on an existing order and provide other similar services.

As to the Reseller Showcase Web-site 3100, Back Office 3040 may review/edit and release purchase orders to the Branded Promotional Products web-site 3110, review/edit and release change order purchase orders on an existing order, and provide other similar services.

As to the Company Logo Store, the services mentioned above may also be offered along with the ability to view product inventory balances.

The Front Office 3050 provides communication between members of the promotional products industry. It may also provide order status and history information. Services available to customers and resellers may include viewing/editing reseller or customer descriptive shopper information; viewing reseller or customer order history and purchases; viewing vendor order status, due date and shipping information for an order; directing email to customers or resellers on order delays and updates, updating customer or reseller service histories, viewing current balance on term accounts and providing other related services.

Specific Vendor Showcase Web-Site 3080 services may also be made available through the Front Office 3050. Vendors may view reseller shopper information, view reseller order history and purchases, send automatic email responses back to the reseller when the order is shipped, and other related options.

Services available to customers may include viewing/editing customer shopper information; viewing order history and purchases; viewing vendor order status, due date and shipping information; sending automatic email responses to customers when order is shipped, delayed or updated, and other related services.

Specific Reseller Showcase Web-site 3100 services may include viewing customer shopping information; viewing customer order history and purchases; sending automatic email responses informing the customer of the status of the order and other related services.

Company Logo Store 3120 services may include viewing order history; viewing/editing shopper information; viewing status, due date, shipping information, current balance and other related services.

In addition, Front Office 3050 may offer market information services for vendors, resellers and customers, such as account summary option, web hits habit reports, and other related market information.

Bidding Module 3030 may provide a forum where resellers or customers present orders and vendors bid on these jobs. Bidding Module 3030 may provide services such as posting price bids on products or imprinting orders; editing or withdrawing bids before terms are accepted; quality control on bids; sending automatic email notices to vendors on being awarded the order; and other related services.

Vendors may post price bids on products or imprinting orders on an auction site provided by the Bidding Module 3030. Resellers may view the auction site and see price bids related to their product or service and even send automatic email notification to resellers and reseller's customers.

Community Content Data 3060 may provide an interface with media partners and business partners where customers, resellers and vendors are offered various services. Vendor may enter processing information at 3160 and Resellers may enter processing information at 3170.

Media or business partners may offer services on the Branded Promotional Products Web-site 3110. These services may include posting job listings pertaining to the promotional product industries, providing education to customers, providing "Ask the Expert" services to customers, providing an alert system for customers, and informing the customer of industry statistics and advanced reports. In addition, design services on web-sites may be provided for customers, resellers or vendors to include artwork recommendations, creation and retouching.

The Artwork Library 3070 may store customers' logos and branding artwork. Customers may create a library and store their company brand logos online, This makes it easier for customers to put their logos on promotional products. Customers may share their art library with other users by granting them access with a password. In addition, customers may add, edit and delete their logos in their art library.

Figure 4:
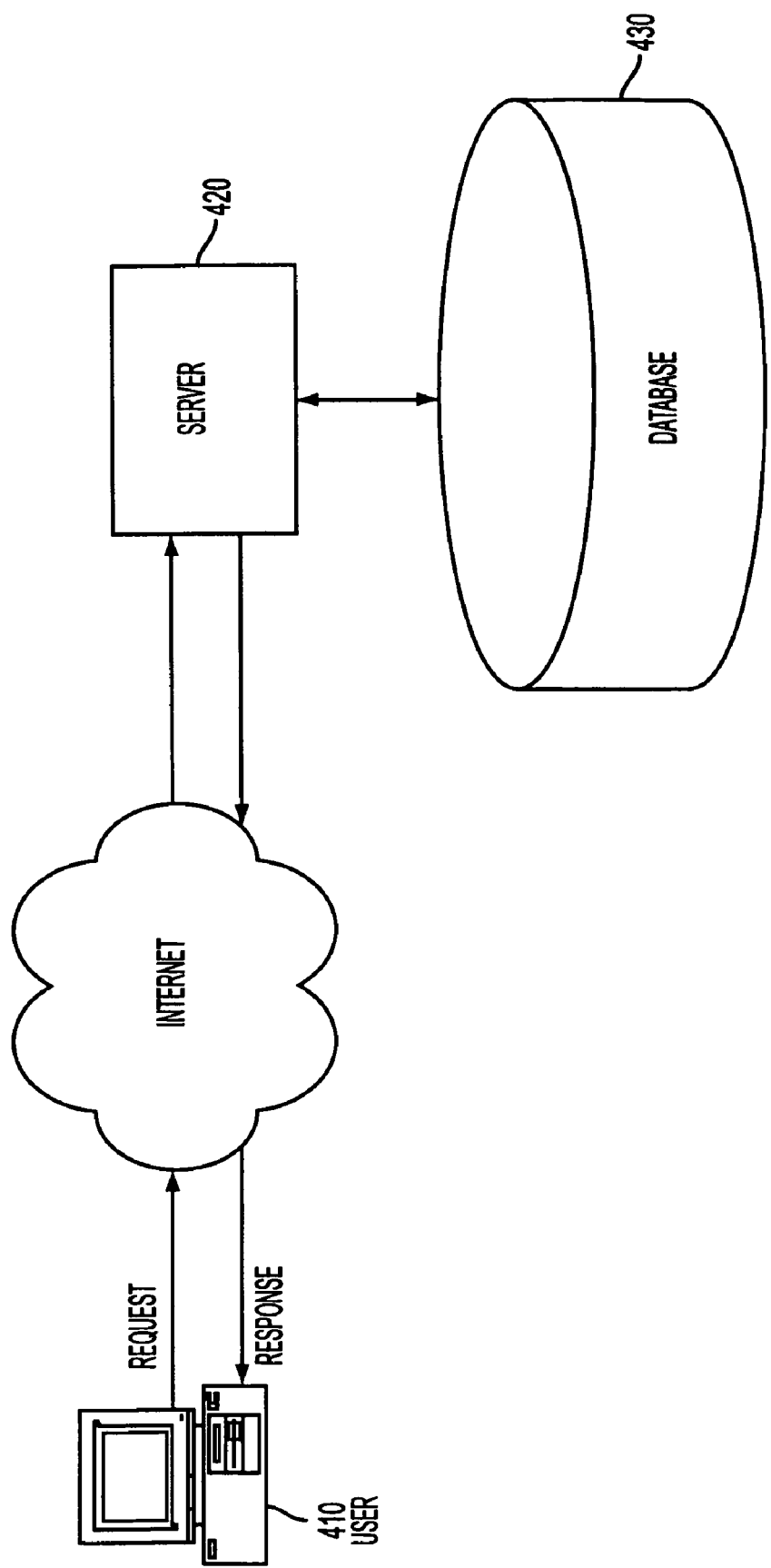
FIG. 4 is a diagram of an overall system according to the present invention.

FIG. 4 is a diagram of an overall system according to the present invention. The user 410, who may be a customer, a reseller, a vendor partner, a business service partner or a media partner, may request a product or service from server 420 through the Internet. Server 420 then retrieves the requested information from database 430. A response is presented to the user once the requested information is obtained.

In a preferred embodiment, the present invention may use Microsoft's internet operating system, Microsoft Site Server Commerce Edition as the e-commerce shopping solutions, Microsoft SQL Server, Microsoft technologies Transaction server and Message queue as data layer servers.

Other embodiments and uses of the invention will be apparent to those skilled in the art from consideration of the specification and practice of the invention disclosed herein. The specification and examples should be considered exemplary only.

What is claimed is:

1. A computer implemented system for acquiring branded promotional products comprising:
    a database containing product information wherein the product information comprises product data and imprinting data related to a plurality of branded promotional products;
    a products interface where a customer or a reseller accesses the products interface to acquire at least one branded promotional products;
    a reseller showcase interface where a customer accesses the reseller showcase interface to acquire at least one branded promotional products;
    a vendor showcase interface where a reseller accesses the vendor showcase interface to acquire at least one branded promotional products;
    a front office interface for providing purchase order information and marketing information and receiving at least one order from one or more resellers or customers wherein the at least one order is related to the plurality of branded promotional products;
    a bidding interface for enabling at least one or more resellers or customers to present at least one order and enabling at least one vendor to bid on the presented order wherein the at least one order is related to the plurality of branded promotional products;
    an artwork library interface for storing customer's logo and branding artwork associated with the plurality of branded promotional products; and
    a processor for processing orders received from the front office interface;
    wherein the database, the products interface, the reseller showcase interface, the vendor showcase interface, the front office interface, the bidding interface, the artwork library interface and the processor are interoperably connected.

2. A computer implemented method for acquiring branded promotional products comprising the steps of:
    maintaining a database containing product information wherein the product information comprises product data and imprinting data related to a plurality of branded promotional products;
    implementing a products interface where a customer or a reseller accesses the products interface to acquire at least one branded promotional products;
    implementing a reseller showcase interface where a customer accesses the reseller showcase interface to acquire at least one branded promotional products;
    implementing a vendor showcase interface where a reseller accesses the vendor showcase interface to acquire at least one branded promotional products;
    implementing a front office interface for providing purchase order information and marketing information and receiving at least one order from one or more resellers or customers wherein the at least one order is related to the plurality of branded promotional products;
    implementing a bidding interface for enabling at least one or more resellers or customers to present at least one order and enabling at least one vendor to bid on the presented order wherein the at least one order is related to the plurality of branded promotional products;
    implementing an artwork library interface for storing customer's logo and branding artwork associated with the plurality of branded promotional products; and
    processing orders for products received from the front office interface through a processor.

3. A computer implemented system for providing a central exchange of data associated with branded promotional products, the computer implemented system comprising:
    a product database for storing data related to a plurality of products, the data including at least pricing data and imprinting data related to the plurality of products;
    a vendor entry point interface for enabling a vendor to enter at least one product data specifics to the product database, the at least one product data specifics comprising one or more of imprinting data, display data, accurate detailed pricing data and product placement data;
    a vendor showcase interface for displaying product data and providing ordering access to one or more resellers at a reseller entry point interface, wherein the vendor showcase interface is customized for a particular vendor;
    a branded promotional products interface for providing a plurality of promotional products to one or more of customers and resellers and receiving at least one order for one or more promotional products;
    a reseller showcase interface for displaying products selected by the reseller for resale to a reseller group of customers selected by the reseller where the reseller group of customers accesses the reseller showcase interface at a reseller customer entry point interface; and
    a company logo store interface for displaying products selected by the reseller for resale to a group of customers associated with a company, wherein the company logo store interface is customized for the company;
    wherein customers comprise users who buy products from the branded promotional products interface; resellers comprise users who resell products to customers; and vendors comprise users who supply one or more of products and imprinting services;
    wherein the product database, the vendor entry point interface; the vendor showcase interface, the branded promotional products interface, the reseller showcase interface, the company logo store interface are interoperably connected.

4. The system of claim 3, further enabling one or more customers to schedule reminders for a recurring event related to ordering promotional products.

5. The system of claim 3, further comprising:
a back office interface for processing the orders for the plurality of promotional products.

6. The system of claim 3, further comprising:
a front interface for providing one or more of order status data, historical information related to orders and market information services wherein the market information services comprise one or more of account summary options and web hits habit reports.

7. The system of claim 3, further comprising:
a bidding interface for enabling one or more of resellers and customers to present at least one order and enabling a plurality of vendors to bid on the presented at least one order.

8. The system of claim 3, wherein the resellers comprise distributors and the vendors comprise suppliers.

9. The system of claim 3, further comprising an artwork library interface for storing artwork associated with at least one of the plurality of products.

10. The system of claim 3, wherein the at least one order is tracked and order status data is provided.

11. A computer implemented method for providing a central exchange of data associated with branded promotional products, the computer implemented method comprising the steps of:
storing data related to a plurality of products, the data including at least pricing data and imprinting data related to the plurality of products at one or more product databases;
enabling a vendor to enter at least one product data specifics at a vendor entry point interface, the at least one product data specifics comprising one or more of imprinting data, display data, accurate detailed pricing data and product placement data;
displaying product data and providing ordering access at a vendor showcase interface to one or more resellers at a reseller entry point interface, wherein the product data is customized for a particular vendor;
providing a plurality of promotional products to one or more of customers and resellers and receiving at least one order for one or more promotional products at a branded promotional products interface;
displaying products selected by the reseller at a reseller showcase interface for resale to a reseller group of customers selected by the reseller where the reseller group of customer accesses the reseller showcase interface at a reseller customer entry point interface; and
displaying products selected by the reseller for resale to a group of customers associated with a company at a company logo store interface, wherein the products are customized for the company;
wherein customers comprise users who buy products from the branded promotional products interface; resellers comprise users who resell products to customers; and vendors comprise users who supply one or more of products and imprinting services.

12. The method of claim 11, further enabling one or more customers to schedule reminders for a recurring event related to ordering promotional products.

13. The method of claim 11, further comprising the step of:
processing the orders for the plurality of promotional products.

14. The method of claim 11, further comprising the step of:
providing one or more of order status data, historical information related to orders and market information services wherein the market information services comprise one or more of account summary options and web hits habit reports.

15. The method of claim 11, further comprising the step of:
enabling one or more of resellers and customers to present at least one order and enabling a plurality of vendors to bid on the presented at least one order.

16. The method of claim 11, wherein the resellers comprise distributors and the vendors comprise suppliers.

17. The method of claim 11, further comprising the step of:
implementing an artwork library interface for storing artwork associated with at least one of the plurality of products.

18. The method of claim 11, wherein the at least one order is tracked and order status data is provided.

* * * * *